(12) United States Patent
Beghini et al.

(10) Patent No.: US 6,558,043 B2
(45) Date of Patent: May 6, 2003

(54) SUSPENSION THRUST BEARING WITH RETAINING MEANS

(75) Inventors: Eric Beghini, La Membrolle (FR); Christophe Houdayer, Tours (FR)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/897,092

(22) Filed: Jul. 3, 2001

(65) Prior Publication Data

US 2002/0003913 A1 Jan. 10, 2002

(30) Foreign Application Priority Data

Jul. 6, 2000 (FR) .............................. 00 08826

(51) Int. Cl.⁷ .............................. F16C 19/10
(52) U.S. Cl. ...................... 384/615; 384/617
(58) Field of Search ................ 384/617, 615, 384/620, 622, 621

(56) References Cited

U.S. PATENT DOCUMENTS 4,566,812 A    1/1986   Takei et al. ................ 384/484
4,995,737 A    2/1991   Moller et al. ............... 384/607
6,267,512 B1   7/2001   Beghini et al. ............. 384/609

FOREIGN PATENT DOCUMENTS

| EP | 0 390 331 | 10/1990 |
|----|-----------|---------|
| FR | 2375484   | 7/1978  |
| FR | 2 513 334 | 3/1983  |
| FR | 2 551 515 | 3/1985  |
| FR | 2 778 606 | 11/1999 |
| FR | 2 779 096 | 12/1999 |

*Primary Examiner*—Lenard A. Footland
(74) *Attorney, Agent, or Firm*—Smith, Gambrell & Russell

(57) ABSTRACT

Suspension thrust rolling bearing device of the type comprising a first ring 12, a second ring 13 made of thin sheet, a row of rolling bodies 14 arranged between the two rings, a cap 16 secured to the first ring and a plate 11 capable of forming a seat for a spring 10. The plate 11 comprises a means for securing it directly axially to the second ring 13 or to the cap 16.

12 Claims, 3 Drawing Sheets

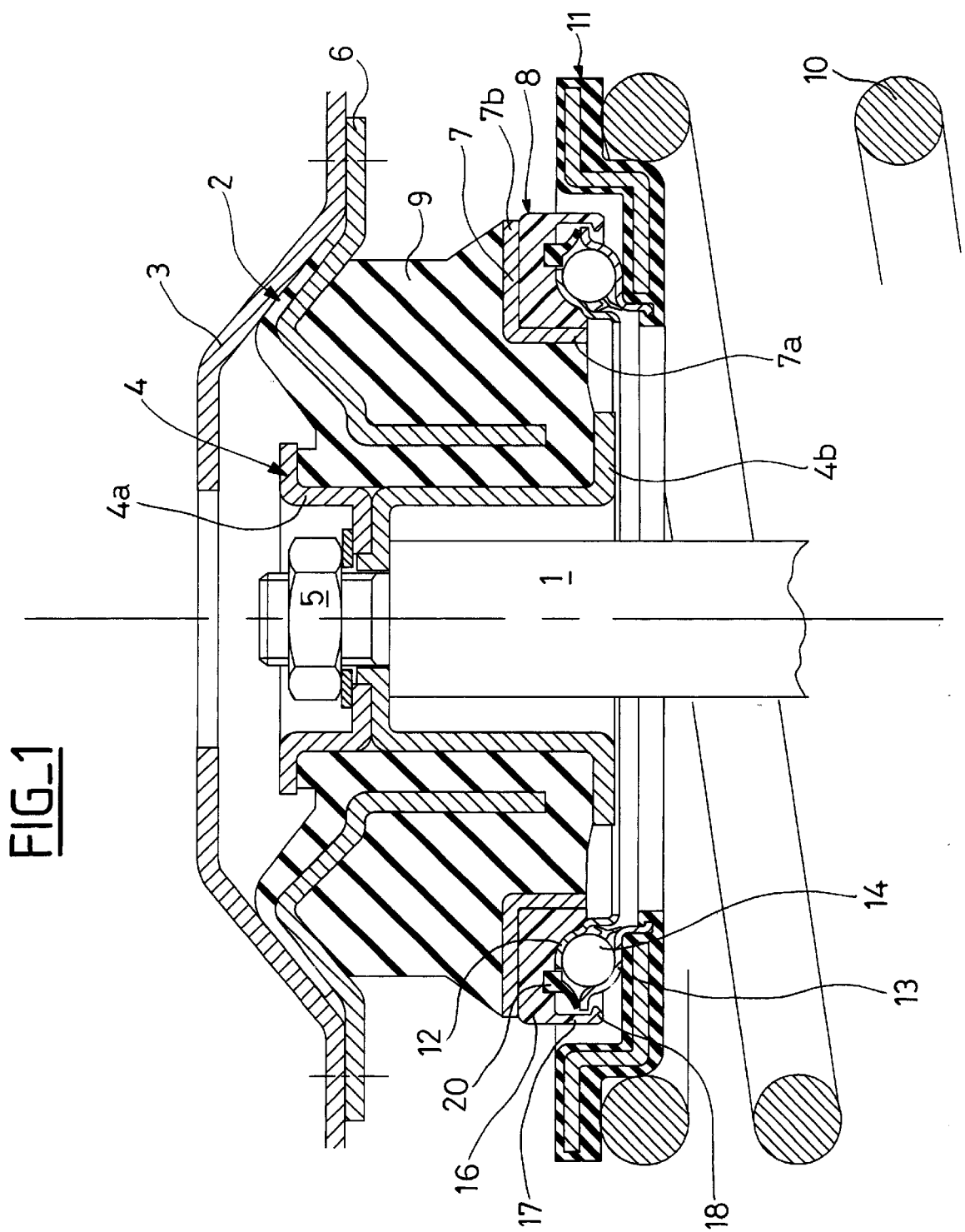
FIG_1

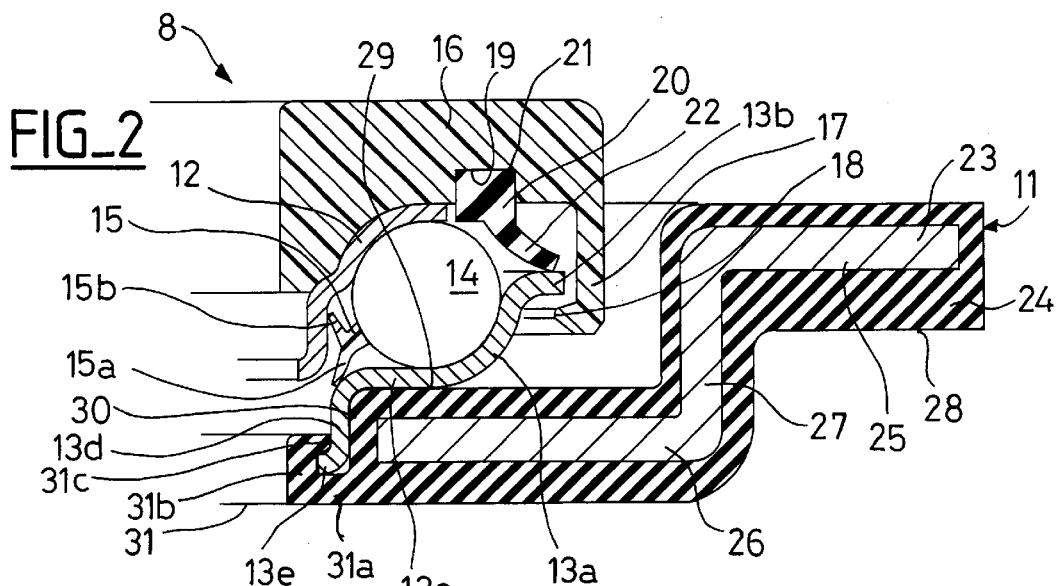
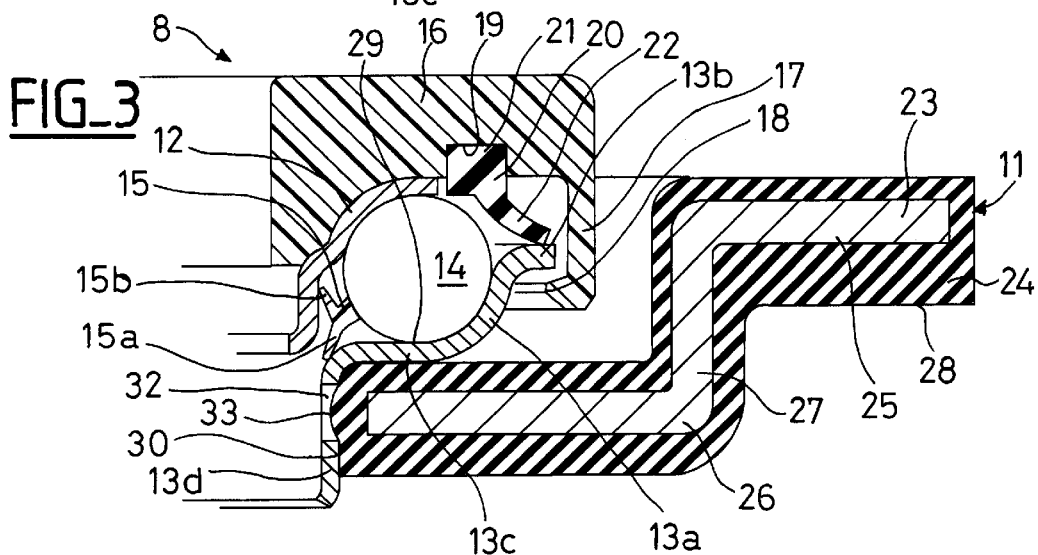
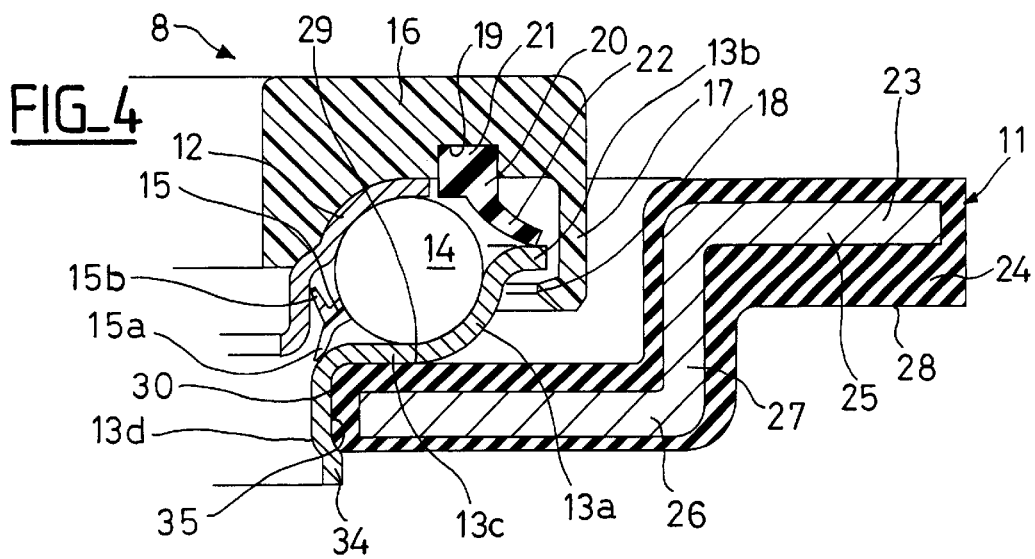

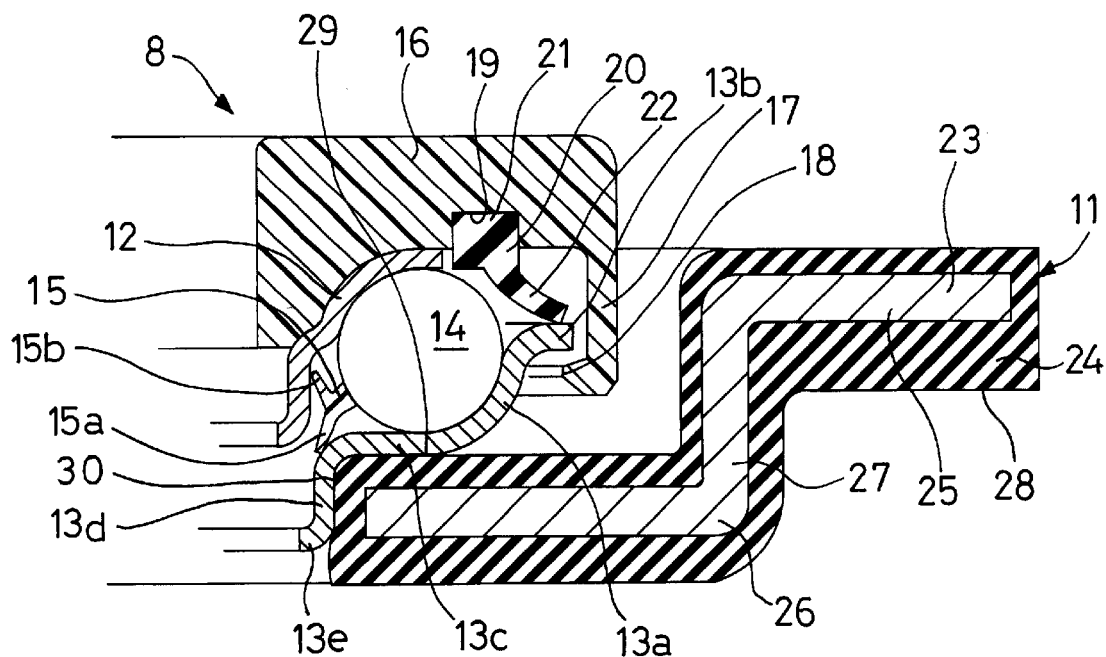
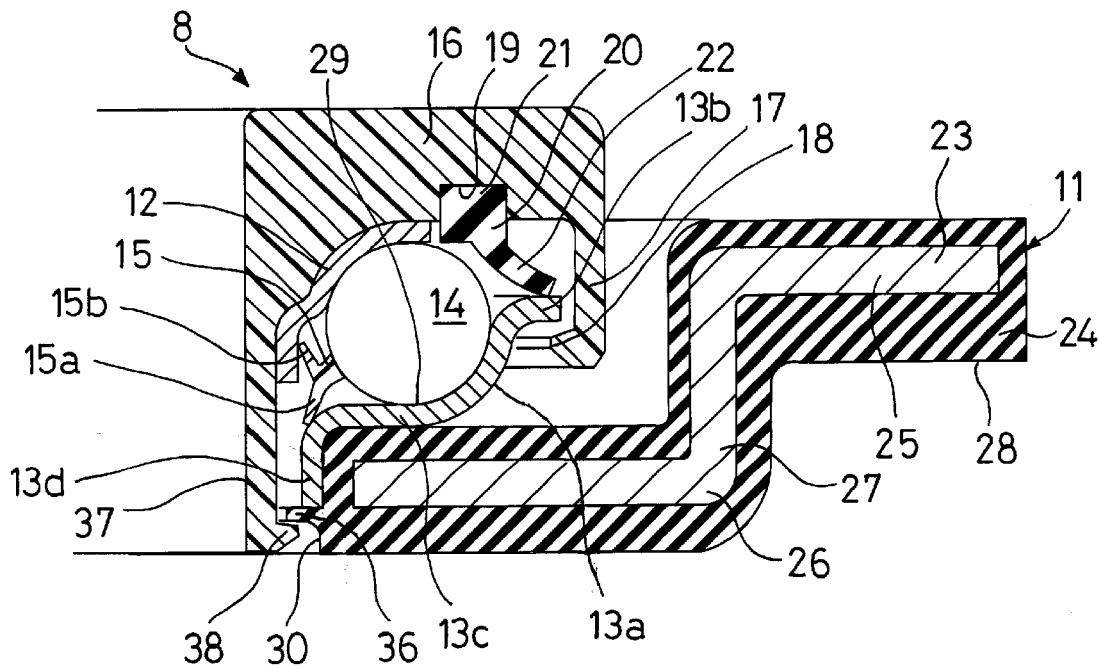

SUSPENSION THRUST BEARING WITH RETAINING MEANS

The present invention relates to the field of suspension thrust bearings used, in particular, on motor vehicles in the telescopic suspension struts for the steered wheels.

A suspension thrust bearing generally comprises an upper ring and a lower ring, between which rolling bodies, in the form of balls or rollers, are arranged.

The invention relates more specifically to the suspension thrust bearings which comprise at least one cap made of synthetic material in contact with one of the two rings of the bearing.

In a way known per se, the suspension thrust bearing is arranged in the upper part of the suspension strut between a lower plate, generally made of metal, also acting as a seat for a suspension spring, and an upper element secured to the body of the vehicle. The spring of the suspension device is installed around the rod of the shock absorber piston, the end of which is secured to an elastic mount. The suspension thrust rolling bearing allows a rotational movement between the spring plate, which can move in rotation, and the elastic mount which is fixed to the body of the vehicle. The suspension thrust bearing also makes it possible to transmit axial forces between the spring and the body of the vehicle. The relative angular movement of the spring plate and of the elastic mount results from a turning of the steered wheel and/or compression of the suspension spring. Reference may be made to French document No. 2 779 096.

The suspension thrust rolling bearings are situated under the body of the vehicle and in close proximity to the wheels which, particularly in rainy weather, throw up contaminants likely to enter the bearing.

In a way known per se, as in documents U.S. Pat. No. 4,995,737 or EP-A-390 331, use may be made of a device employing one or two plastic caps, each cap capping a ring and having means of axial retention collaborating with the other cap. The caps are generally made of glass-fibre-reinforced plastic to give them the necessary strength and rigidity. This material proves to be too rigid and too abrasive for a rubbing seal formed of this material, in the form of a lip for example, to be effective enough.

The invention proposes a suspension thrust rolling bearing with effective sealing capable also of being secured to the lower plate prior to mounting on the strut so as, with the said plate, to constitute a compact assembly which can easily be handled and transported without the risk of accidental loss of one of the components.

The suspension thrust rolling bearing device according to one aspect of the invention is of the type comprising a first ring secured to a cap, a second ring made of thin sheet, a row of rolling bodies arranged between the two rings, a cap secured to the first ring and a plate capable of forming a seat for a spring. The plate comprises a means for securing it directly axially to the second ring, the said means being capable of collaborating with retaining means arranged on a tubular portion of the second ring.

Advantageously, the second ring comprises a first toric portion tailored to the rolling bodies, and a second toric portion extending from the first toric portion radially inwards and axially away from the rolling bodies.

In one embodiment of the invention, the second ring comprises a radial portion extending radially inwards from the toric portion and a tubular portion extending axially away from the rolling bodies.

In one embodiment of the invention, the second ring comprises a retaining portion extending from the second toric portion.

In one embodiment of the invention, the retaining portion extends radially inwards.

In one embodiment of the invention, the retaining portion extends radially outwards.

Advantageously, the plate comprises an annular groove formed from a surface in contact with the second ring.

In one embodiment of the invention, the groove has two concentric surfaces, one of them more or less cylindrical and the other having at least one radial enlargement situated away from the bottom of the said groove and capable of collaborating with the second ring.

In one embodiment of the invention, the groove has a diameter smaller than that of the imaginary circle that passes through the centre of the rolling bodies.

Advantageously, the second ring is capable of collaborating with the groove.

As a preference, the plate has a metal insert and a part made of synthetic material, for example moulded.

The plate may comprise at least one radial projection arranged in a depression or slot in the second ring.

The plate may also be press-fitted onto the second ring.

The plate may comprise a radial bulge capable of collaborating with a radial bulge of the cap to secure these elements together axially.

A suspension thrust rolling bearing is thus produced, whose size both axial and radial is not altered by comparison with known rolling bearings and which has excellent sealing and excellent means of retaining these various elements on one another.

The invention will be better understood and other advantages will become apparent from reading the detailed description of a number of embodiments taken by way of non-limiting examples and illustrated by the appended drawings, in which:

FIG. 1 is a view in axial section of a suspension thrust rolling bearing in the assembled state;

FIG. 2 is a detail view of FIG. 1; and

FIGS. 3 to 6 show alternative forms.

A shock absorber comprises a cylinder in which there may slide a piston, the rod 1 of which is connected by its upper end to an elastic mount 2 which rests in an element of the chassis 3 forming a seat and is secured thereto.

The elastic mount 2 comprises:
  an interior connecting element 4, made in two parts 4*a* and 4*b*, to which the end of the rod 1 of the shock absorber piston is mounted by means of a nut 5,
  an exterior connecting element 6 used for securing to the chassis 3,
  an upper plate 7 acting as a seat for the thrust rolling bearing 8,
  a block of rubber 9 bonded to the surface of these three parts and connecting them together, filtering vibration.

The exterior connecting element 6 is, at one end, fixed to the chassis 3, for example by screwing or bolting and, at the other end, arranged axially between the two parts 4*a* and 4*b*. The upper plate 7 is arranged axially in the region of the interior connecting element 4 but is of a larger diameter. It is also possible to see the suspension spring 10, the upper end of which bears on the lower plate 11, which in turn bears on the thrust rolling bearing 8.

The upper plate 7 comprises a cylindrical portion 7*a* extending downwards, away from the chassis 3, and a radial portion 7*b* extending outwards. The interior surface of the cylindrical portion 7*a* and the upper surface of the radial portion 7*b* are covered with the elastic material used in the elastic mount 2.

The suspension thrust bearing 8 proper is more clearly visible in FIG. 2 and comprises an upper ring 12 and a lower ring 13, both made of sheet, between which the balls 14 are housed. The balls 14 are held by a cage 15 made of synthetic material, which is extended on one side by a sealing lip 15a which rubs against the lower ring 13 and, on the other side, by a lip 15b which rubs against a bearing surface of the upper ring 12.

The thrust rolling bearing 8 further comprises an upper cap 16, made of synthetic material, such as a glass-fibre-reinforced polyamide, covering the surface of the upper ring 12 on the opposite side to the rolling bodies 14 and matching in terms of shape the exterior surface of the axial portion 7a and the lower surface of the radial portion 7b of the upper plate 7. The upper cap 16 comprises a more or less tubular skirt 17 extending downwards from its large-diameter edge and radially surrounding the rolling bodies 14, at least in part. Formed on the bore of the skirt 17, near its lower free end, are radial protrusions 18 projecting inwards and forming hooks. Of course, the hooks 18 could be replaced by a continuous annular bulge projecting radially inwards.

The lower ring 13 comprises a toroidal portion 13a having a concave surface tailored to the rolling bodies 14 and a radial portion 13b extending the toroidal portion 13a outwards and located more or less mid-way up the rolling bodies. The free end of the radial portion 13b is of a diameter greater than the diameter of the circle inscribed over the tops of the hooks 18. Thus, the hooks 18 are capable axially of retaining the lower ring 13 with respect to the remainder of the thrust rolling bearing prior to definitive mounting in the suspension assembly.

The lower ring 13 further comprises another radial portion 13c extending the small-diameter end of the toroidal portion 13a inwards. In other words, the radial portion 13c connects to the toroidal portion 13a radially in the region of the imaginary circle passing through the centre of the balls 14. A tubular portion 13d extends downwards, away from the cap 16, from the small-diameter end of the radial portion 13c. A portion forming a retaining means in the form of a radial rim 13e extends the end of the tubular portion 13d away from the cap 16 inwards.

The upper cap 16 further comprises an annular groove 19 with a more or less radial bottom and with more or less axial edges formed near the large-diameter free end of the upper ring 12, higher up than the rolling bodies 14. The groove 19 has a diameter greater than that of the imaginary circle formed by the centre of the rolling bodies 14.

The thrust rolling bearing 8 is supplemented by a seal 20, made for example of rubber, comprising a heel 21 pushed into the groove 19 and a lip 22 extending both downwards and radially outwards from the heel 21 and coming into rubbing contact with a bearing surface consisting of the upper surface of the radial portion 13b of the lower ring 13. The surface 13c is annular and more or less radial. However, it is conceivable for it to be inclined.

On the outside of the rolling bodies 14, sealing is thus afforded, on the one hand, by the narrow passage formed between the skirt 17 of the upper cap 16 and the free end of the radial portion 13b of the lower ring 13, and on the other hand, by the contact between the sealing lip 32 and the said radial portion 13b of the lower ring 13. A very high quality seal is thus obtained. On the inside of the rolling bodies 14, sealing is obtained through the lips 15a and 15b coming from the cage 15 and in contact, respectively, with the lower ring 13 and with the upper ring 12. Here again, effective sealing is obtained.

The lower ring 13 of the thrust rolling bearing 8 bears against the lower plate 11 which comprises a metal reinforcement 23 covered with a part 24 made of synthetic material which, also, filters out vibration likely to rise up from the wheels of the vehicle towards the body.

The lower plate 11 advantageously has at least one drain hole (not depicted) passing through the radial portion 26 and its coating, thus making it possible to avoid any build-up of water in the spring plate.

The metal reinforcement 23 has an annular overall shape with two axially offset radial portions 25 and 26 meeting at a tubular portion 27. The radial portions 25 and 26 extend respectively outwards and inwards from the tubular portion 27. The spring 10 bears against a lower surface 28 of the synthetic part 24 in line with the radial portion 25. The lower ring 13 is in contact via its radial portion 13c with an upper radial surface 29 of the synthetic part 24 in line with the radial portion 26 and by its tubular portion 13d with a cylindrical interior surface 30 of the synthetic part 24.

The synthetic part 24 comprises a radial bulge 31 of annular overall shape having a radial portion 31a arranged under the radial rim 13e and extending inwards from the cylindrical interior surface 30, an axial portion 31b arranged on the inside of the radial rim 13e and extending upwards, towards the cap 16, from the radial portion 31a, and a radial portion 31c arranged at the top of the axial portion 31b and extending outwards from the axial portion 31b. The radial portion 31c may be continuous in the form of an annular bulge or discontinuous thus forming a number of hooks. The radial portion 31c is arranged above the radial rim 13e. The diameter of the free end of the radial portion 31c is greater than the diameter of the free end of the radial rim 13e.

In other words, the lower plate 11 comprises a groove delimited by two concentric surfaces, one more or less cylindrical, namely the cylindrical interior surface 30 of the synthetic part 24, and the other having at least one radial enlargement situated away from the bottom of the said groove and capable of collaborating with the lower ring 13, namely the radial portion 31c of the bulge 31.

The diametral interference between these two elements allows axial retention between the lower ring 13 and the lower plate 11. As the cap 16 and the lower ring 13 are also equipped with means of mutual axial retention, an assembly is formed that comprises the lower plate 11, the cap 16, the upper ring 12, the lower ring 13, the balls 14 and the cage 15 which is easy to handle and to transport without the risk of parts being lost.

FIG. 3 illustrates an alternative form in which the lower ring 13 comprises a tubular portion 13d which is longer than before, pierced with a number of slots 32 forming retaining means. The slots 32 may be replaced by radial depressions, not depicted, obtained by deforming the sheet inwards. The synthetic part 24, having no bulge, has a cylindrical interior surface 30 of a diameter, in the unconstrained state, smaller than that of the tubular portion 13d. After assembly, the elastic material tends to revert to its initial dimensions and shape at the openings and the cylindrical interior surface 30 deforms and projects slightly into the slots 32, thus axially securing the lower ring 13 and the lower plate 11. The projections carry the reference 33.

FIG. 4 illustrates an alternative form in which the lower ring 13 comprises a long tubular portion 13d provided with radial deformation 34 outwards near its free end so that it forms a shallow annular groove 35 on its exterior surface. The synthetic part 24, with no bulge, has a cylindrical interior surface 30 of a diameter, in the unconstrained state, smaller than that of the tubular portion 13d. After assembly, the cylindrical interior surface 30 is in contact with the annular groove 35. The lower plate 11 is retained axially in the annular groove 34 by the radial deformation 34 that forms the retaining means.

FIG. 5 illustrates an alternative form in which the lower ring 13 is similar to that of FIGS. 1 and 2 and the synthetic part 24 of the lower plate 11 is similar to that of FIG. 4. The synthetic part 24 is press-fitted via its cylindrical interior surface 30 onto the exterior surface of the tubular portion 13d.

FIG. 6 illustrates an alternative form in which the lower ring 13 comprises a tubular portion 13d which is shorter than the one in FIGS. 1 and 2. The synthetic part 24 comprises a bulge 36 of annular overall shape, extending radially inwards from the cylindrical interior surface 30. The bulge 36 is continuous or discontinuous thus forming a number of hooks and may be in contact with the free end of the tubular portion 13d. The upper cap 16 comprises a tubular skirt 37 extending downwards from a region lying between the upper ring 12 and the cylindrical portion 7a of the upper plate 7. The free end of the tubular skirt 37 has a radial bulge 38 directed outwards and arranged under the bulge 36. The bulge 38 is continuous or discontinuous thus forming a number of hooks and has an outside diameter greater than the inside diameter of the bulge 36. This then forms means for axially retaining the cap 16 and the lower plate 11. The upper ring 12 and lower ring 13, the balls 14 and the cage 15 are also axially retained between the cap 16 and the lower plate 11.

The fact that the seal 20 is separate from the upper cap 16 allows the upper cap 16 to be made of a very rigid material, for example a fibre-reinforced, particularly a glass-fibre-reinforced material, and the seal 20 out of a material which has the desired flexibility for effective sealing, for example an elastomer or a very flexible plastic not reinforced with glass fibre. Press-fitting the seal 20 into the groove 19 guarantees that the said seal 20 will be held reliably.

By virtue of the invention, practical and effective retention can be enjoyed, in a small size, for a thrust rolling bearing.

What is claimed is:

1. A suspension thrust rolling bearing device comprising a first ring, a second ring made of thin sheet, a row of rolling bodies arranged between the two rings, a cap secured to the first ring and a plate capable of forming a seat for a spring, wherein the plate comprises a means for securing it directly axially to the second ring, the said means being capable of collaborating with retaining means arranged on a tubular portion of the second ring.

2. The device according to claim 1, wherein the second ring comprises a toric portion tailored to the rolling bodies, a radial portion extending radially inwards from the toric portion and a tubular portion extending axially away from the rolling bodies.

3. The device according to claim 2, wherein the second ring comprises a retaining portion extending from the tubular portion.

4. The device according to claim 3, wherein the retaining portion extends radially inwards.

5. The device according to claim 3, wherein the retaining portion extends radially outwards.

6. The device according to claim 1, wherein the plate comprises an annular groove formed from a surface in contact with the second ring.

7. The device according to claim 6, wherein the groove has two concentric surfaces, one of them more or less cylindrical and the other having at least one radial enlargement situated away from the bottom of the said groove and capable of collaborating with the second ring.

8. The device according to claim 6, wherein the groove has a diameter smaller than that of the imaginary circle that passes through the center of the rolling bodies.

9. The device according to claim 6, wherein the second ring is capable of collaborating with the groove.

10. The device according to claim 1, wherein the plate has at least one radial projection arranged in a depression or slot in the second ring.

11. The device according to claim 1, wherein the plate is press-fitted into the second ring.

12. The device according to claim 1, wherein the plate has a radial bulge capable of collaborating with a radial bulge of the cap to secure these elements together axially.

* * * * *